US005867905A

United States Patent [19]

Whale et al.

[11] Patent Number: 5,867,905

[45] Date of Patent: Feb. 9, 1999

[54] APPARATUS FOR MANUFACTURING A TRUSS

[75] Inventors: Luke Richard John Whale, Alton; Alan Peter Shuttle; Leonard Michael Beale, both of Farnham; James Francis Pirrie Goebel; Michael Anthony McCully, both of Aldershot, all of England

[73] Assignee: Gang-Nail Systems Limited, Aldershot, United Kingdom

[21] Appl. No.: 381,954

[22] PCT Filed: Aug. 10, 1992

[86] PCT No.: PCT/GB92/01480

§ 371 Date: Sep. 14, 1995

§ 102(e) Date: Sep. 14, 1995

[87] PCT Pub. No.: WO94/03312

PCT Pub. Date: Feb. 17, 1994

(Under 37 CFR 1.47)

[51] Int. Cl.[6] ...... B23P 15/00

[52] U.S. Cl. ...... 29/897.31; 29/729

[58] Field of Search ...... 29/897.31, 709, 29/720

[56] References Cited

U.S. PATENT DOCUMENTS

| | | |
|---|---|---|
| Re. 27,692 | 7/1973 | Post . |
| 3,599,562 | 8/1971 | Hutchens, Sr. . |
| 4,365,734 | 12/1982 | Harris . |
| 4,669,184 | 6/1987 | Castillo . |
| 4,998,336 | 3/1991 | Papsdorf . |
| 5,092,028 | 3/1992 | Harnden . |

FOREIGN PATENT DOCUMENTS

| | | |
|---|---|---|
| 147252 | 8/1968 | New Zealand . |
| 151878 | 12/1969 | New Zealand . |
| 169940 | 1/1975 | New Zealand . |
| 172865 | 7/1976 | New Zealand . |
| 181457 | 3/1981 | New Zealand . |

*Primary Examiner*—Larry I. Schwartz
*Assistant Examiner*—Marc W. Butler
*Attorney, Agent, or Firm*—Weiner, Carrier, Burt & Esser, P.C.; Irving M. Weiner; Joseph P. Carrier

[57] ABSTRACT

The invention provides apparatus for manufacturing a truss, comprising a plurality of press heads (8) arranged in a single plane about a fixed datum point (12) and movable within the plane about the datum point (12), wherein the press heads (8) are each connected to control means for automatically positioning each head (8) with respect to the datum point (12). The invention also provides a press head (8) for use in such apparatus, comprising a platen (24) and a retractable trolley (34), the trolley (34) having a trolley head (36) and being movable between a retracted position wherein the upper surface of the trolley head (36) is level with or below the upper surface of the platen (24), and an operating position wherein the lower surface of the trolley head (36) is located above the upper surface of the platen (24) so that when the trolley (34) is in the operating position, the platen (24) can be raised towards the trolley head (36) to carry out a pressing action on any truss members (28) and connectors (30, 32) located therebetween. The invention further provides apparatus for connecting a plurality of timber members comprising a fixed pressing member (102), a platen (100) movable with respect to the pressing member (102) and means (106, 110, 112) for introducing at least one connector (108) between the pressing member (102) and the platen (100), wherein the platen (100) and/or the pressing member (102) comprise holding means for holding the or each connector (108) in place during movement of the platen (100).

19 Claims, 5 Drawing Sheets

APPARATUS FOR MANUFACTURING A TRUSS

The invention relates to apparatus for manufacturing a truss, a press head for use therein and a method of connecting timber members together.

Until recently, roof trusses have exclusively been manufactured manually. However, over the years, various developments have been made which have assisted in the manufacturing process. For example, machines having a plurality of press heads each having an integral platen have been developed wherein the press heads and platens are manually positioned at the joints of the truss and locked in position. The members forming the truss are positioned on the platens and all of the press heads are then operated simultaneously and from a central control to press connectors into the joints to form a self supporting structure. Another type of known jig consists of separate platens and press heads wherein the platens are first laid out at their required joint locations (often they are strung together to form long continuous sections for ease), and suspended or floor mounted press heads are then individually moved into position at each joint and operated. A further type of known jig consists of a solid roller used to press connector plates into the joints. The plates are loosely fixed at the joints by hammering and then the entire truss assembly is fed into the roller mechanism which acts rather like a mangle to press the connectors into the joints and fix the truss members together.

It is also known to provide a large truss table whereon stops are manually located at required positions, continuous platens are laid at and between all joints and then a travelling beam press traverses the truss stopping at each joint under manual control and presses the joints together. U.S. Pat. No. 4,943,038 discloses a similar truss assembly table having a plurality of sections in each of which a plurality of jig stops is provided which can be positioned to enable the truss members to be accurately positioned with respect to one another on the table prior to connection. The jig stops are each positioned by means of a lead screw driven by a manually operated drill. However, although each jig stop is positioned by a power-operated device, these devices are manually operated and each jig stop therefore requires individual attention.

The known apparatus for assisting in the manufacture of trusses is therefore time consuming to operate and labour intensive. The average time taken to set up suitable apparatus for manufacturing a run of identical trusses is half an hour to an hour. Pressing a run of 8 to 10 trusses will also typically take about half an hour. Thus the setting up of the jig usually occupies at least 50% of the production time and hence a considerable proportion of the cost. It is an object of the present invention to provide apparatus which enables a truss to be accurately and swiftly manufactured. It is a further object of the invention to reduce the labour costs involved in manufacturing trusses.

The invention provides apparatus for manufacturing a truss, comprising a plurality of press heads arranged in a single plane about a fixed datum point and movable within the plane about the datum point, wherein the press heads are each connected to powered driving means and to control means for controlling the powered driving means and for automatically determining the desired position of each head with respect to the datum point such that each head can be automatically driven to its desired position, characterised in that each press head comprises a platen and a retractable trolley, each trolley having a trolley head and being movable between a retracted position wherein the upper surface of the trolley head is level with or below the upper surface of the platen, and an operating position wherein the lower surface of the trolley head is located above the upper surface of the platen so that, when the trolley is in the operating position, the platen can be raised towards the trolley head to carry out a pressing action on any truss members and connectors located therebetween.

Preferably, the platens and trolleys are all simultaneously operable, although it is envisaged that the platens and trolleys can be selectively operable according to the truss to be manufactured. Preferably, each press head is rotatable about an axis perpendicular to the single plane with respect to the support structure on which it is mounted.

Preferably, the apparatus further comprises an automatic feeding device for automatically feeding connectors to the press heads. This speeds up the operation of the apparatus to manufacture a number of trusses of a given configuration.

The invention also provides a press head for use in apparatus for manufacturing a truss, comprising a platen and a retractable trolley, the trolley having a trolley head and being movable between a retracted position and an operating position, characterised in that, in the retracted position, the upper surface of the trolley head is level with or below the upper surface of the platen and, in the operating position, the lower surface of the trolley head is located above the upper surface of the platen so that, when the trolley is in the operating position, the platen can be raised towards the trolley head to carry out a pressing action on any truss members and connectors located therebetween. Preferably, the trolley is located adjacent the platen when in the retracted position and the upper surfaces of the trolley head and the platen are substantially coplanar. Also, it is preferred if frame members are attached to the platen along at least one side thereof to allow connectors to be placed freely between the upper surface of the platen and the truss members to be used to form a truss, the connectors being pressed into the truss members on operation of the press head. More preferably, the frame members are attached to the platen along three sides thereof, the platen being preferably rectangular in shape. This avoids the need for the truss members to rest on the connectors which can lead to instability of the truss members during manufacture and movement of the connectors away from their desired positions before pressing occurs.

It is preferred that the frame members are retractable during operation of the press heads to a position wherein the frame members do not project above the upper surface of the platen.

In an advantageous embodiment, the frame members are releasably attached to the platen.

In an advantageous embodiment of the invention, holding means are located directly or indirectly on the platen for holding at least one timber member in place with respect to the platen during operation of the press head. Preferably, the holding means are retractable during operation of the press head to a position wherein the holding means do not project above the upper surface of the platen. Furthermore, it is preferable if the holding means comprise at least one pneumatically operated cylinder clamp arranged to press against a respective timber member to hold the said timber member in place. Ideally, the holding means are mounted on the frame members located on the platen.

The invention also provides apparatus for connecting a plurality of timber members comprising a fixed pressing member, a platen movable with respect to the pressing member and means for introducing at least one connector between the pressing member and the platen, characterised in that the platen and/or the pressing member comprise magnetic holding means for holding the or each connector in place during movement of the platen. Preferably, the holding means comprise electromagnets located in or on the platen and/or the pressing member. The means for introducing at least one connector between the pressing member and the platen are preferably arranged to deliver connectors therebetween in pairs. More preferably, the connectors comprise pairs of gang-nail plates arranged so that the nails of each plate interengage with the nails of the other plate. When the platen is moved away from the pressing member, one connector of the pair is held on each of the platen and the pressing member until connection of the timber members takes place.

The invention also provides a method of connecting retracted position and the upper surfaces of the trolley head and the platen are substantially coplanar. Also, it is preferred if frame members are attached to the platen along at least one side thereof to allow connectors to be placed freely between the upper surface of the platen and the truss members to be used to form a truss, the connectors being pressed into the truss members on operation of the press head. More preferably, the frame members are attached to the platen along three sides thereof, the platen being preferably rectangular in shape. This avoids the need for the truss members to rest on the connectors which can lead to instability of the truss members during manufacture and movement of the connectors away from their desired positions before pressing occurs.

It is preferred that the frame members are retractable during operation of the press heads to a position wherein the frame members do not project above the upper surface of the platen.

In an advantageous embodiment, the frame members are releasably attached to the platen. Preferably, the frame members are each releasably attached to the platen by means of clamping devices specifically adapted to allow rapid and accurate clamping without overtightening. Each clamping device preferably comprises an abutting member for abutting against either the frame or the platen, and a projecting member extending away from the abutting menber, the projecting member carrying at least one radially extending projection for interengagement with cammed groove means and being rotatable about an axis with respect to the cammed groove means, wherein the projecting member is slidably mounted with respect to the abutting member and is biased into a retracted position by means of resilient means acting between the projecting member and the abutting member such that, in use and on interconnection of the at least one projection carried by the projecting member and the cammed groove means and relative rotation therebetween, the projecting member is forced into an extended position against the biasing of the resilient means. Preferably, the respective frame member is permanently carried by the projecting member of the clamping device or devices arranged to connect the frame member to the platen. This reduces the risk that the appropriate clamping device or devices will be mislaid or dropped and also reduces the risk of damage to either the frame or the clamping device by allowing accurate and firm clamping without overtightening.

In an advantageous embodiment of the invention, holding means are located directly or indirectly on the platen for holding at least one timber member in place with respect to the platen during operation of the press head. Preferably, the holding means are retractable during operation of the press head to a position wherein the holding means do not project above the upper surface of the platen. Furthermore, it is preferable if the holding means comprise at least one pneumatically operated cylinder clamp arranged to press against a respective timber member to hold the said timber member in place. Ideally, the holding means are mounted on the frame members located on the platen.

The invention also provides apparatus for connecting a plurality of timber members comprising a fixed pressing member, a platen movable with respect to the pressing member and means for introducing at least one connector between the pressing member and the platen, wherein the platen and/or the pressing member comprise holding means for holding the or each connector in place during movement of the platen. Preferably, the holding means comprise electromagnets located in or on the platen and/or the pressing member. The means for introducing at least one connector between the pressing member and the platen are preferably arranged to deliver connectors therebetween in pairs. More preferably, the connectors comprise pairs of gang-nail plates arranged so that the nails of each plate interengage with the nails of the other plate. When the platen is moved away from the pressing member, one connector of the pair is held on each of the platen and the pressing member until connection of the timber members takes place.

The invention also provides a method of connecting timber members together utilising apparatus as described above comprising the steps of:

(a) moving the platen to a connector-receiving position with respect to the fixed pressing member;

(b) introducing a pair of gang-nail connectors to the space between the platen and the pressing member;

(c) actuating electromagnets located in or on the platen and the pressing member to hold one connector against the platen and one connector against the pressing member;

(d) moving the platen and the respective connector held thereagainst away from the pressing member and the other respective connector to a retracted position;

(e) introducing the timber members to be connected to the space between the platen and the pressing member;

(f) moving the platen towards the pressing member so that the connectors held against the platen and pressing member are pressed into the timber members;

(g) deactivating the electromagnets to release the timber members from the apparatus and moving the platen away from the pressing member; and (h) removing the timber members from the apparatus.

Embodiments of the invention will now be described with reference to the accompanying drawings wherein.

Figure 3:
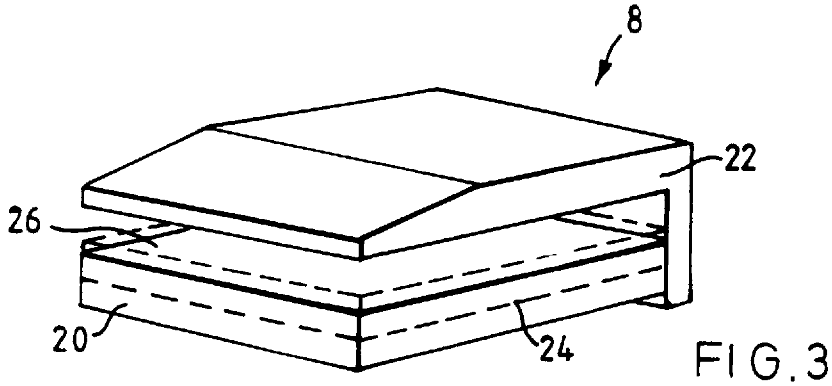
FIG. 3 is a perspective schematic view of a press head forming part of the apparatus of either of FIGS. 1 and 2.
Figure 4A:
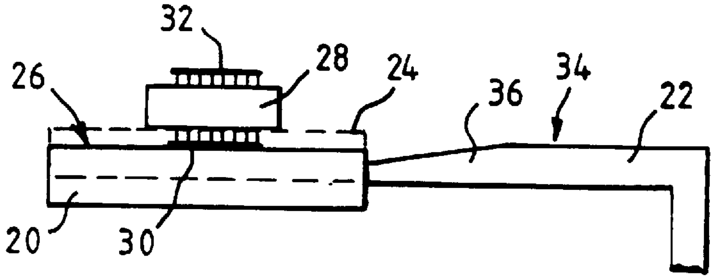
Figure 4B:
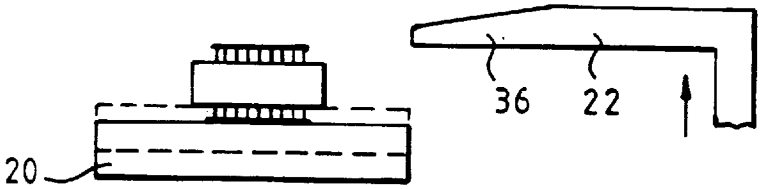
Figure 4C:
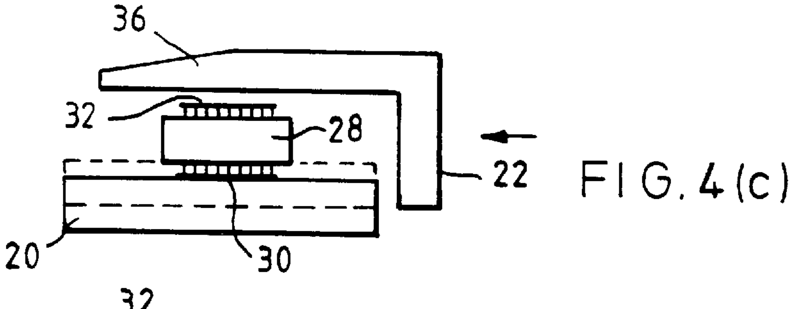
Figure 4D:
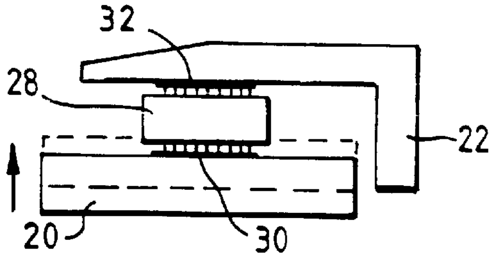
Figure 5:
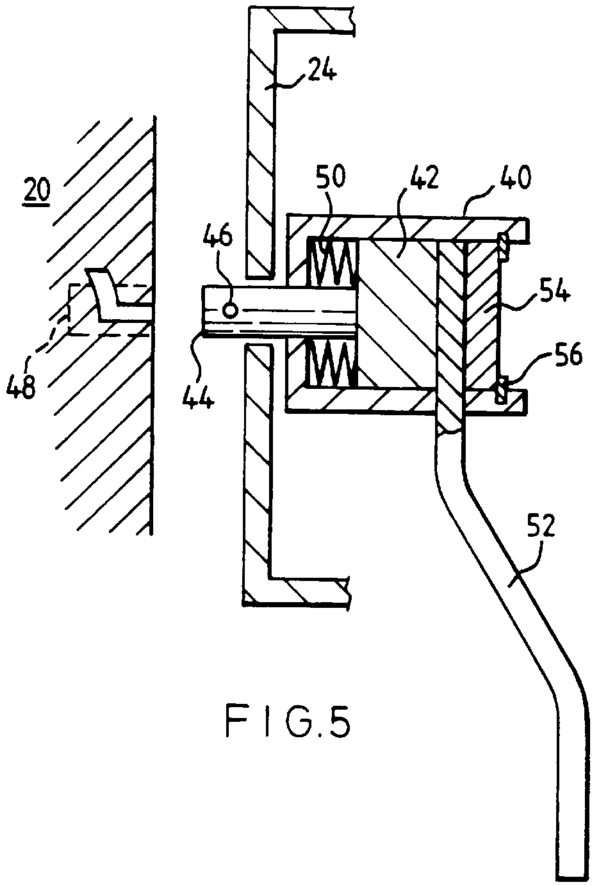
Figure 6:
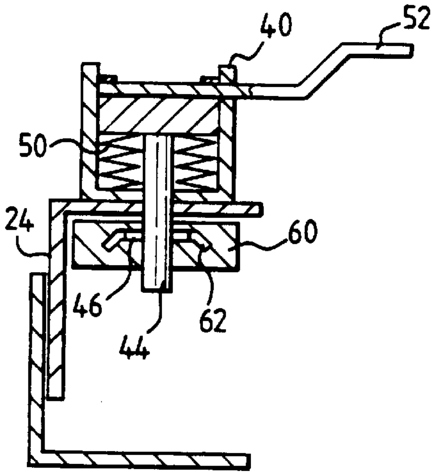
Figure 7:
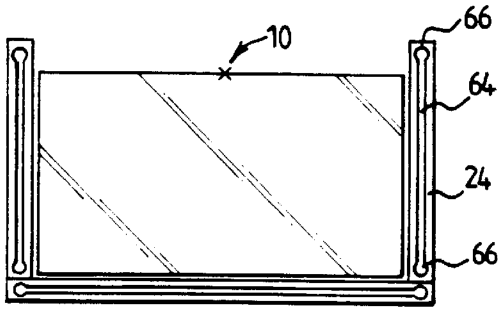
Figure 8:
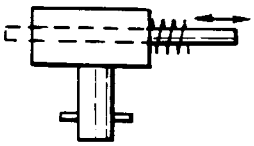
Figure 9A:
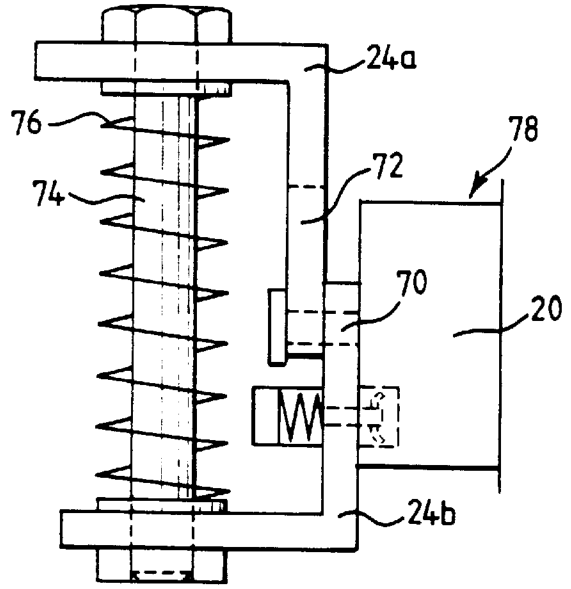
Figure 9B:
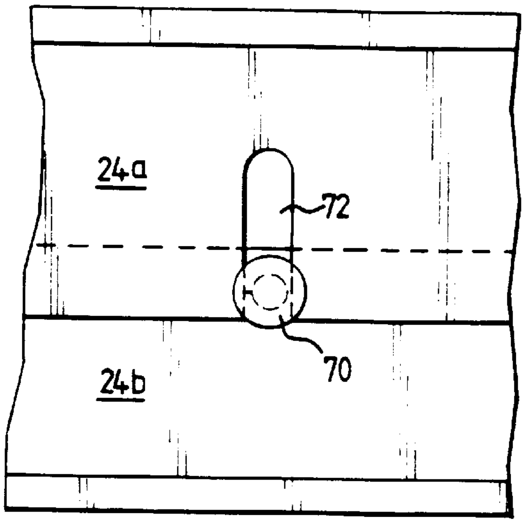

FIGS. 4*a,* 4*b,* 4*c* and 4*d* are schematic diagrams showing the operation of the press head of FIG. 3;

FIG. 5 is a schematic sectional view of a clamping device used in the apparatus of any of FIGS. 1 to 4;

FIG. 6 is a schematic sectional view of an alternative clamping device for use in the apparatus of any of FIGS. 1 to 4;

FIG. 7 is a plan view of a platen forming part of a press head with frame members mounted on three sides thereof;

FIG. 8 is a schematic view of a pneumatic clamp for use in the apparatus of any of FIGS. 1 to 4;

FIG. 9*a* is a schematic sectional view of a frame for attachment to the platen of FIG. 7;

FIG. 9*b* is a schematic front view of part of the frame of FIG. 9*a;* and FIGS. 10*a* to 10*d* are schematic views of apparatus for connecting timber members incorporating a device for automatically feeding connectors to the press head.

Figure 1:
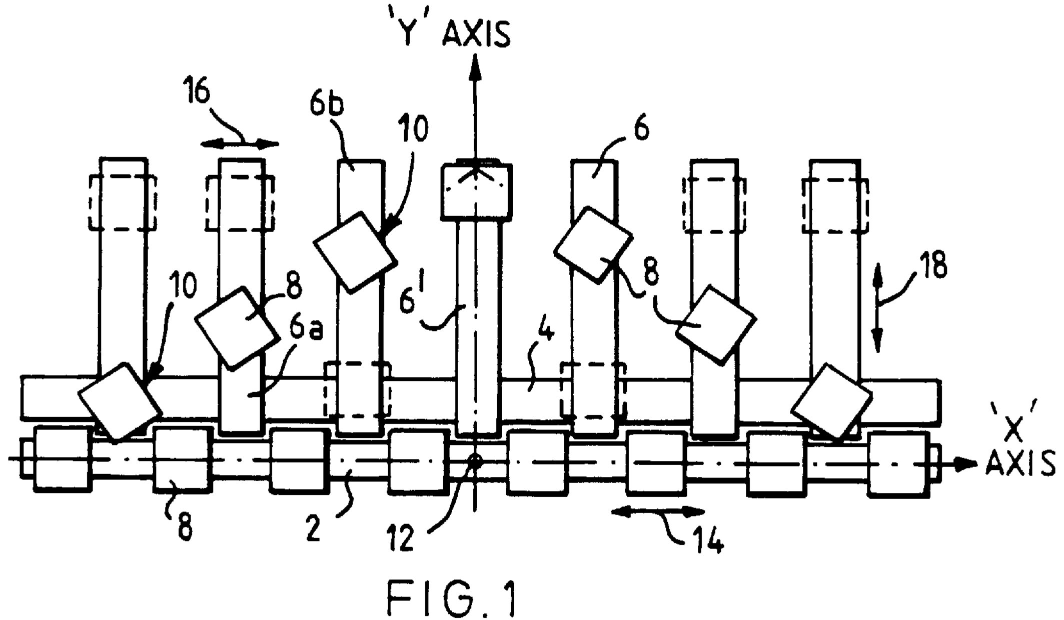
FIG. 1 is a schematic diagram of apparatus according to a first embodiment of the invention.

The apparatus illustrated in FIG. 1 comprises a transversely extending support structure 2 and a transverse track 4 extending parallel to the support structure 2. A plurality of longitudinally extending support structures 6 are arranged so that one end 6*a* of each support structure 6 is supported on and movable along the track 4. The opposite end 6*b* of each support structure 6 is supported on a wheeled carriage (not shown) or other suitable supporting means allowing each support structure to move along the track 4.

A plurality of press heads 8 are mounted upon the support structures 2,6. The transverse support structure 2 carries a plurality of press heads, a total of eight being illustrated in FIG. 1. Each of the longitudinally extending support structures 6 is shown carrying two press heads 8 except for the central support structure 6' which carries only a single press head. However, each support structure 6 can carry any number of press heads (typically between one and three). Furthermore, the press heads are removable from the support structures 6 so that any one support structure 6 can have press heads added or removed to suit any particular design requirement. Each press head 8 located on the longitudinally extending support structures 6 is rotatable about an axis 10 located substantially centrally of one edge of the press head (see FIG. 7). The press heads located on the transversely extending support structure 2 need not be rotatable but can be if so desired. Each press head 8 is furthermore slidably movable along the respective support structure 2,6 so as to vary its position therealong. Driving means for carrying out the sliding movement are provided, but not shown for reasons of clarity. Driving means (not shown) are also provided for moving the support structures 6 along the track 4.

The central point of the transversely extending support structure 2 is designated the datum point 12. This datum point can be fixed at any suitable point within the overall geometry of the apparatus or, indeed, outside if desired. It is not necessary for the datum point to be fixed as illustrated in FIG. 1, but it is convenient to fix the datum point at a specific point along the transverse support structure 2. An X axis and a Y axis have also been illustrated in FIG. 1 to assist in the description of the apparatus set out below. The X and Y axes intersect at the datum point and the X axis extends along the transverse support structure 2 and the Y axis extends parallel to the longitudinally extending support structures 6.

The apparatus of the invention also incorporates control means (not shown) which operate to drive the driving means and so to position the press heads 8 appropriately to manufacture a truss of a particular shape. The position of all joints in the desired truss relative to the datum point are input into the control apparatus. The control apparatus then determines, by means of monitoring and comparative devices (not shown), the difference between the actual position of each press head 8 and its desired position in order to manufacture the required truss. The control means then actuates the driving means to alter the position and orientation of each press head 8 in response to the value of the error between the actual position of the press head 8 and its desired position. The driving means are arranged to move the press heads 8 located on the transverse support structure 2 along the support structure 2 in the direction of arrow 14 to their desired positions; to drive the support structures 6 in the direction of arrow 16 to locate the press heads 8 mounted thereon in their correct "X axis" positions with respect to the datum point; and to move the press heads 8 mounted on the support structures 6 in the direction of arrow 18 in order to achieve the correct "Y axis" position of each press head 8 with respect to the datum point 12. Once the desired positions of each press head are received by the control means, then each press head 8 can be moved by the control means to its desired position. The press heads can be moved in pairs, in groups or all together which reduces the amount of time required to set up the apparatus to produce a specific truss. The control means is also capable of rotating the press heads 8 about their axes 10 to align the press 8 heads in the direction of the members which will form the truss. Once all of the press heads are correctly positioned, they can be held in those positions by an automatic braking system (not shown).

For safety reasons, a system of lights and/or sirens (not shown) can be used to reduce the risk of accident or injury to persons near the jig. Red lights are arranged to light up or flash when the press heads 8 are moving or in operation. Hooters and sirens are also sounded. Also, an automatic stop and reverse system is provided to reduce the risk of accidents. Indicators (not shown) are provided on each press head 8 to show when the respective press head 8 is in the required position. A red light indicates an incorrect posit on, an amber light indicates that the error is within certain limits and a green light shows that the press head is positioned correctly. This enables the press heads to be manually positioned, if necessary, when for example the driving means are for any reason inoperable.

Figure 2:
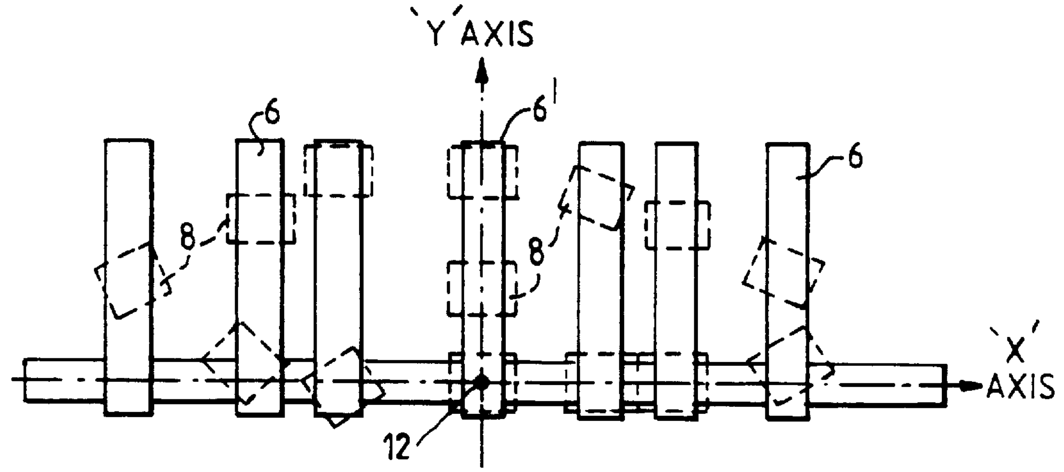
FIG. 2 is a schematic diagram of apparatus according to a second embodiment of the invention.

FIG. 2 shows an alternative arrangement according to the invention similar to that shown in FIG. 1 but omitting the transversely extending support structure. The only support structures provided are those extending longitudinally 6. As described above, the support structures 6 are movable along the track 4. The datum point 12 is relocated to the intersection of the track 4 and the centre support structure 6' which may, if desired, be fixed with respect to the track 4. The X and Y axes are also relocated to pass, respectively, parallel and perpendicular to the track 4 and through the datum point 12. As with the apparatus of FIG. 1, the datum point can in fact be located at any convenient position with respect to the jig.

Press heads 8 are mounted on the support structures 6 in sufficient numbers for at least one press head 8 to be positioned at each joint of the truss to be manufactured. Press heads are positioned near the track 4 to deal with joints located on the bottom chord of the truss. Alternatively, the truss could be manufactured "upside down"; i.e with the bottom chord extending parallel to the track 4 but adjacent the opposite ends of the support structures 6 to those mounted on the track.

This embodiment is even more versatile than the apparatus described above and facilitates the manufacture of trusses having bottom chords which are angled or which contain non-parallel sections. It is envisaged that this type of apparatus will require a larger number of support structures 6 than would be required by the apparatus of FIG. 1 to accommodate the number of joints commonly required along a bottom chord.

Both of the embodiments of FIGS. 1 and 2 utilise identical press heads 8. Each press head 8 is substantially as shown in FIGS. 3 and 4. FIG. 3 shows a press head in its operational configuration. The press head 8 consists of a platen 20 and a trolley 22. The trolley 22 is movable between a retracted position (shown in FIG. 4*a*) and an operational position (shown in FIGS. 3 and 4*c*). Suitable mechanical means by which the trolley 22 can be moved in relation to the platen 20 are well known and will not be described here.

A frame 24 (shown in dotted lines in FIGS. 3 and 4) is attached to the platen 20. The frame itself and the means of connection will be described below. The purpose of the frame 24 is to allow a space between the upper surface 26 of the platen 20 and the lower surface of a truss member 28 positioned on the press head 8 during the manufacturing process.

The manufacturing process will now be described.

When the press heads 8 have been correctly positioned by the control means, the truss members can be positioned on the apparatus shown in FIG. 1 or 2. This involves laying truss members 28 across the frames 24 of each press head 8 and holding them in place by means of pneumatic timber clamps and stops (described below). A connector 30 is positioned on the upper surface 26 of the platen in the space between the platen 20 and the truss member 28. A further connector 32 is positioned on top of the truss member 28. A signal is then given by the operator via the control means to commence the pressing operation and warning sirens and lights are operated. The trolley 22 is initially in its retracted position, being located adjacent the platen 20 with the upper surface 34 of the trolley head 36 substantially level with the upper surface 26 of the platen. The trolley 22 is then moved upward as shown in FIG. 4*b* and subsequently transversely so that the trolley head 36 is located directly above the platen 20. The trolley head 36 is also located above the truss member 28 and the two connecting members 30,32. The final step of the pressing operation is to raise the platen 20 with respect to the trolley 22 with sufficient force to press the connectors 30,32 into the truss member 28. The pressing motion is automatically ended when a sufficient force has been applied for a predetermined time. The lifting mechanism by means of which the platen 20 is raised is preferably hydraulically operated and controlled by the same control means used to position the press heads 8. By a reversal of the steps just described, the trolley 22 returns to its retracted position adjacent the platen 20 and the pneumatic timber clamps are automatically released to facilitate rapid handling of the truss off the jig.

Each of the press heads 8 is operated in an identical manner. If all of the press heads 8 are being used to manufacture a particular truss, then all of the press heads will be operated at the same time. If, however, there are a number of press heads which are not required in the manufacture of a particular truss, then the control means will select only the press heads which are required and will not operate those which are not required.

The frame 24 mentioned above is necessary to allow a connector to be positioned beneath the truss member 28 without rendering the truss member unstable with respect to the apparatus. In some cases, it will be necessary for two press heads 8 to be located very close to one another and it may be necessary for part or all of the frame surrounding any particular platen 20 to be removed. For any one platen or group of platens, sufficient frames will be needed to adequately support the timber to be connected. In order to achieve this, a clamping device such as that illustrated in FIG. 5 is utilised. The device consists of a housing 40 in which is slidably located a cylindrical member 42 carrying a projecting member 44. The projecting member 44 carries bayonet catches 46 which are locatable in cammed grooves 48 formed in the side walls of the platen 20. A disc spring 50 is located between the end wall of the housing 40 and the adjacent face of the cylindrical member 42 and the spring 50 biases the projecting member 44 into a retracted position. The cylindrical member 42 is retained in the housing by means of a handle member 52 rotatably fixed to the cylindrical member 42; the handle member 52 abuts against a disc shaped member 54 which is securely fixed by means of a split ring in the housing 40. The frame 24 is non-releasably mounted on the projecting member 44 between the housing and the bayonet catches 46. The clamping device and the frame 24 cannot therefore be separated.

In order to securely clamp the frame 24 onto the platen 20, the projecting member 44 and the bayonet catches 46 are introduced into the cammed grooves 48 in the platen 20 to bring the frame 24 into abutment with the platen 20. The handle 52 is then rotated so that the bayonet catches 46 engage with the cammed surface of the grooves 48. As the bayonet catches 46 travel along the cammed grooves 48, the projecting member 44 is forced into an extended position against the bias of the spring 50. The movement involved is, in fact, very slight. This type of clamping device can be used to rapidly achieve a high clamping force without risking damage to the clamping device, or to the components being clamped, by overtightening. The frame 24 can be easily and quickly removed from the platen if desired merely by rotation of the handle 52 in the opposite direction to that required for connection, followed by removal of the projecting member 44 from the cammed groove 48.

FIG. 6 shows a variation of the connector shown in FIG. 5 adapted for connection to a frame 24 so that the housing 40 can act as a stop member to assist in positioning the timber member on the platen. The connector itself is virtually identical with the connector shown in FIG. 5 but has a slightly longer projecting member 44 on which is mounted a clamping member 60 having internal cammed grooves 62. The bayonet catches 46 are arranged at the ends of these cammed grooves 62. The clamping member 60 is rectangular in shape, although any non-circular shape would be adequate.

The operation of the clamping device as a stop is as follows: The projecting member 44 and clamping member 60 are introduced into a slot 64 running the length of an appropriate frame 24 by means of one of two keyways 66 appearing at either end of the slot 64 (see FIG. 7). The stop is then slid along the slot 64 with the frame member 24 located between the clamping member 60 and the housing 40. When the desired position has been reached, the handle 52 is rotated to cause the bayonet catches 46 and the clamping member 60 rotate as well. The clamping member 60 will, after a certain amount of rotation, abut against the frame 24 due to the non-circular shape of the clamping member. Further rotation of the handle 52 will cause the bayonet catches 46 to travel along the cammed grooves 62 and thus force the projecting member 44 into an extended position against the bias of the spring 50. A high clamping force between the housing 40 and the clamping member 60 is thereby achieved without undue effort and without a risk of overtightening. The stop is thereby accurately and easily located on the frame 24 and can, if required, be accurately and easily relocated.

The connector described above in relation to FIGS. 5 and 6 is extremely versatile. For example, the connector can be adapted to receive pneumatic holding stops for assisting in the location and gripping of timber members in relation to the platen. Ideally, pneumatic cylinder stops as illustrated in FIG. 8 are connectable to the upper surface of the stop shown in FIG. 6 so that the pneumatic stops can be easily positioned at any suitable point around the platen. The platens of the apparatus shown in FIGS. 1 to 4 will ideally have at least two pneumatic holdings stops located along at least one side of the platen and mounted on the appropriate frame. Fixed stops may also be provided on the frame members to provide an abutment for the timber members against which the pneumatic holding stops may press the timber members. The pneumatic holding stops are controlled by the control means described above so that, when the press heads have all been correctly positioned and the timber members introduced to the jig assembly, the pneumatic holding stops can then be acuated to grip the timber members in place for the duration of the pressing operation.

In order to achieve an effective pressing operation, the platen must be able to press the lower connector into the lower surface of the timber members located on the press head. The frame members which support the timber members and also the stops and holding means should therefore be retractable to a position wherein they do not impede the pressing operation. This can be achieved by providing a retractable frame as shown in FIGS. 9*a* and 9*b*. These figures show a frame 24 having two parts; an upper part 24*a* and a lower part 24*b*. The lower part 24*b* is releasably connected to the platen 20 by means of at least one connector as shown in FIG. 5 and described above. The upper part 24*a* of the frame 24 is connected to the lower part 24*b* by means of a bolt 70 which passes through a circular aperture in the lower part 24*b* but through an elongated slot 72 in the upper part 24*a*. A retention bolt 74 extends between the upper part 24*a* and the lower part 24*b* with a helical spring 76 arranged therealong. The action of the spring 76 biases the upper part 24*a* away from the lower part 24*b* so that the bolt 70 is retained at the lower end of the slot 72. The biasing force of the spring 76 is sufficient to keep the upper part 24*a* of the frame member 24 in the position shown in FIG. 9*a* even when a timber member is supported thereon. Only when the pressing action takes place and the platen 20 is forced towards the trolley head (see FIG. 3), is the upper part 24*a* forced downwardly so that the upper part 24*a* retracts beneath the upper surface 78 of the platen 20.

The apparatus described above can be enhanced by the provision of automatic feed apparatus for supplying connectors direct to the press heads. An automatic feeding device is described below in conjunction with apparatus for connecting timber members.

The apparatus, shown in FIGS. 10*a*–10*d*, comprises a press head having a movable platen 100 and a fixed pressing member 102. The platen 100 is movable in a vertical direction towards and away from the pressing member 102 as shown by the arrow 104. The apparatus also comprises a store 106 wherein pairs of gang-nail plates or other suitable connectors 108 are stacked ready for supply to the press head. The store 106 terminates at its lower end in a feed tunnel 110 along which a pair of connectors 108 can be pushed by means of a rod 112. Each of the platen 100 and the pressing member 102 contain electromagnets (not shown) which enable the connectors 108 to be held against the platen and pressing head 100, 102 when the electromagnets are operated.

The operation of the apparatus will now be described.

Figure 10A:
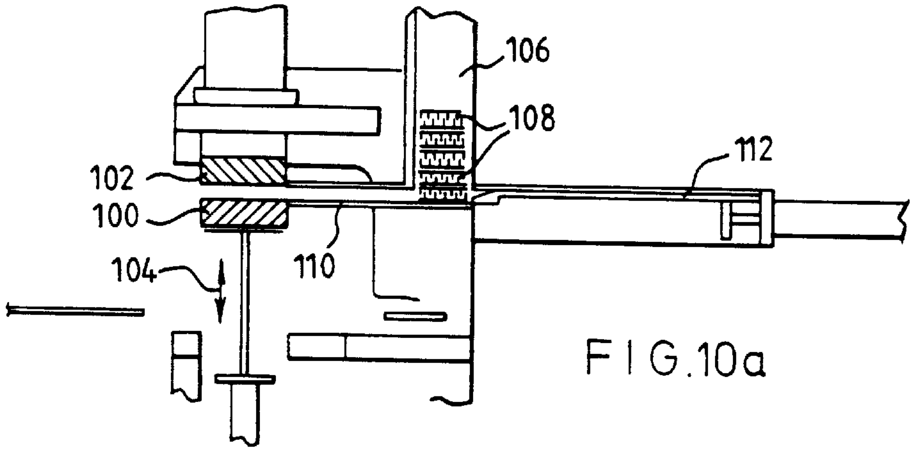
Figure 10B:
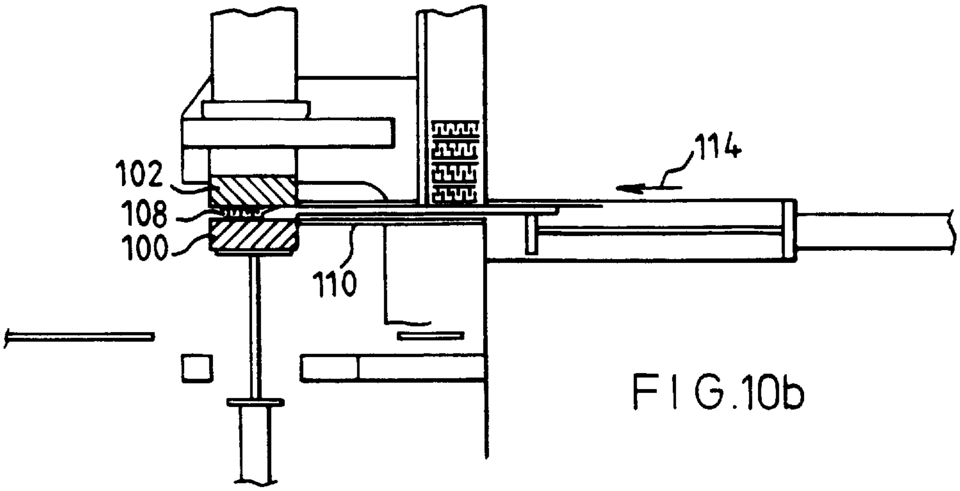
Figure 10C:
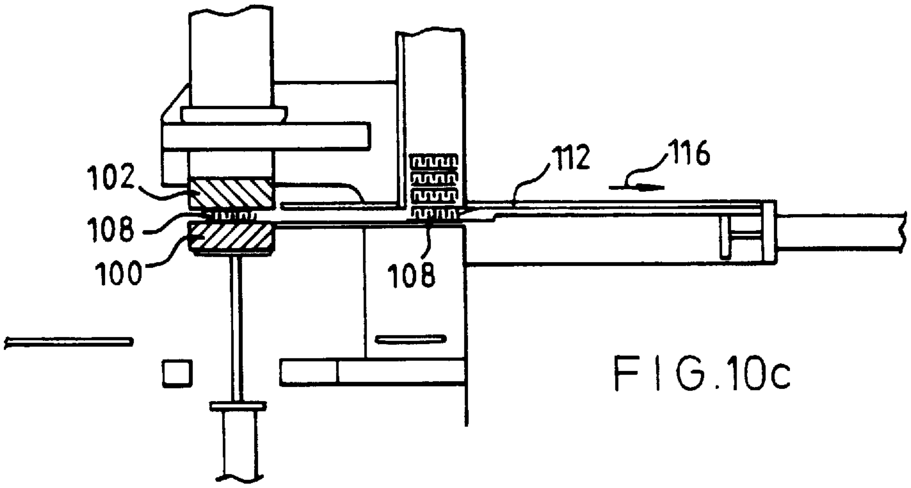
Figure 10D:
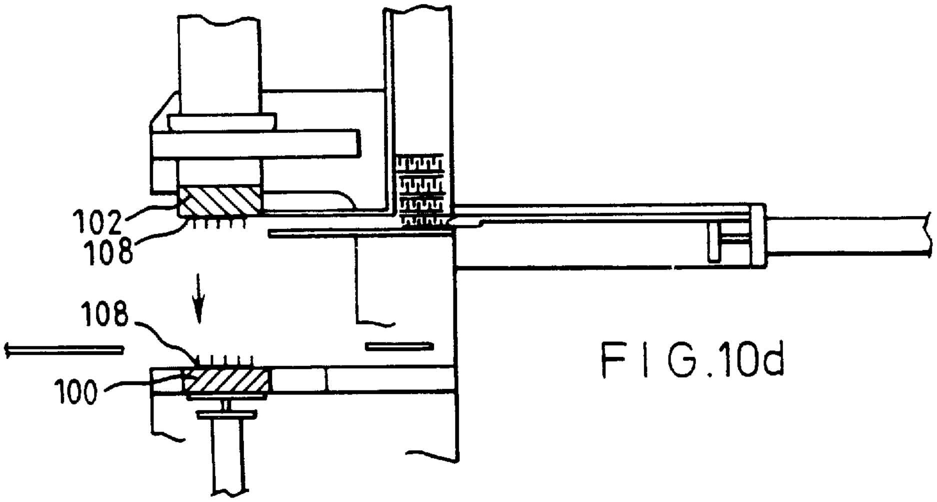

Initially, the platen 100 is moved upwardly towards the pressing member 102 to a connector-receiving position as shown in FIG. 10*a*. The distance between the platen 100 and the pressing member 102 is approximately the width of a pair of connectors 108 or a little larger. The rod 112 then pushes the lowermost pair of connectors along the feed tunnel 110 in the direction of arrow 114 until the connectors 108 are located between the platen 100 and the pressing member 102. The rod 112 is then retracted to its original position in the direction of arrow 116 to allow a further pair of connectors 108 to fall under the influence of gravity to the position previously held by the pair of connectors now positioned between the platen 100 and the pressing member 102 (see FIG. 10*c*). The electromagnets are now activated so that the connectors 108 positioned between the platen 100 and the pressing member 102 are attracted thereto. The connectors, which are in the form of gang-nail plates initially positioned with their respective nails interengaging, are thus held firmly in the position shown in FIGS. 10*c*. The platen 100 can then be moved away from the pressing member 102 which results in the separation of the connectors 108 which are then held firmly against the upper surface of the platen 100 and the lower surface of the pressing member 102 as shown in FIG. 10*d*.

The apparatus can now be used to join timber members together by introducing the respective timber members between the platen 100 and the pressing member 102 in the required orientation and pressing the connectors 108 into the timber members by upward movement of the platen 100 towards the pressing member 102. The electromagnets are then deactivated to release the connectors from the platen 100 and the pressing member 102 and the platen 100 can then be moved away from the pressing member 102 to allow the timber members to be removed from the apparatus.

It is envisaged that the platen and pressing member of the apparatus described above can be made permanently magnetic if desired. Furthermore, the connectors can be of any suitable variety and need not be gang-nail plates. It is preferred that a warning mechanism be incorporated into the apparatus to indicate when the supply of connector pairs is becoming low. Safety apparatus such as guards and warning signals operable during the pressing operation will reduce the number of accidents and injuries caused by pressing the connectors into the timber members. The platen is preferably moved by means of a hydraulic press, but could alternatively be moved by any other suitable means.

This type of automatic feeding apparatus can be applied to devices other than the truss manufacturing device shown in FIGS. 1 to 4 and described above. Various embodiments and uses will be apparent to one skilled in the art.

We claim:

1. Apparatus for manufacturing a truss, comprising:

a plurality of press heads (8) arranged in a single plane about a fixed datum point (12) and movable within said plane about said datum point (12);

said press heads (8) are each connected to powered driving means and to control means for controlling said powered driving means and for automatically determining the desired position of each said head (8) with respect to said datum point (12) such that each said head (8) can be automatically driven to its desired position;

each said press head (8) comprises a platen (20) and a retractable trolley (22), each said trolley 22 having a trolley head (36) and being movable between a retracted position and an operating position wherein the lower surface of said trolley head 36 is located above the upper surface (26) of said platen (20) so that, when said trolley (22) is in said operating position, said platen (20) can be raised towards said trolley head (36) to carry out a pressing action on any truss members (28) and connectors (30, 32) located therebetween, and when said trolley (22) is in said retracted position, the upper surface (34) of said trolley head (36) is level with or below said upper surface (26) of said platen (20).

2. Apparatus as claimed in claim 1, wherein:

said control means are computer operated.

3. Apparatus as claimed in claim 1 or 2, wherein:

each said press head (8) is rotatable about an axis (10) perpendicular to said plane.

4. Apparatus as claimed in claim 1 or 2, wherein:

said press heads (8) are connected to said control means for automatic operation of said platens (20) and trolleys (22) to press said connectors (30, 32) into said truss members (28).

5. Apparatus as claimed in claim 1 or 2, wherein:

said platens (20) and trolleys (22) are all simultaneously operable.

6. Apparatus as claimed in claim 1 or 2, wherein:

said platens (20) and trolleys (22) are selectively operable.

7. Apparatus as claimed in claim 1 or 2 further comprising:

an automatic feeding device for automatically feeding connectors (108) to said press heads (8).

8. Apparatus as claimed in claim 1 or 2, wherein:

each said press head (8) is rotatable about an axis (10) perpendicular to said plane; and said press heads are connected to the control means for automatic operation of said platens (20) and trolleys (22) to press the connectors (30, 32) into the truss members.

9. A press head for use in apparatus for manufacturing a truss, comprising:

a platen (20) and a retractable trolley (22);

said trolley (22) having a trolley head (36) and being movable between a retracted position and an operating position;

the lower surface of said trolley head (36) is located above the upper surface (26) of said platen (20) in said operating position;

in said retracted position, the upper surface (34) of said trolley head (36) is level with or below said upper surface (26) of said platen (20); and when said trolley (22) is in said operating position, said platen (20) can be raised towards said trolley head (36) to carry out a pressing action on any truss members (28) and connectors (30, 32) located therebetween.

10. A press head as claimed in claim 9, wherein:

in said retracted position, said trolley is located adjacent said platen (20) and the upper surfaces of said trolley head (36) and said platen (20) are substantially coplanar.

11. A press head as claimed in claim 9 or 10, wherein:

holding means are located directly or indirectly on said platen (20) for holding at least one truss member (28) in place with respect to said platen (20) during operation of said press head (8).

12. A press head as claimed in claim 9, wherein:

holding means are located directly or indirectly on said platen (20) for holding at least one truss member (28) in place with respect to said platen (20) during operation of said press head (8); and said holding means are retractable during operation of said press head (8) position beneath the level of the upper surface of said truss member (28) or members.

13. A press head as claimed in claim 9 or 10, wherein:

holding means are located directly or indirectly on said platen (20) for holding at least one truss member (28) in place with respect to said platen (20) during operation of said press head (8); and said holding means comprise at least one pneumatically operated cylinder clamp arranged to press against a respective truss member (28) to hold said truss member (28) place.

14. A press head as claimed in claim 9 or 10, wherein:

frame members (24) are attached to said platen (20) along at least one side thereof to allow connectors (30) to be placed between said upper surface (26) of said platen (20) and said truss members (28) to be used to form a truss, said connectors (30) being pressed into said truss members (28) on operation of said press head (8).

15. A press head as claimed in claim 9 or 10, wherein:

frame members (24) are attached to said platen (20) along at least one side thereof to allow connectors (30) to be placed between said upper surface (26) of said platen (20) and said truss members (28) to be used to form a truss, said connectors (30) being pressed into said truss members (28) on operation of said press head (8); and said frame members (24) are retractable during operation of the press head (8) to a position wherein the frame members (24) do not project above the upper surface (26) of the platen (20).

16. A press head as claimed in claim 9, 10 or 12, wherein:

holding means are located directly or indirectly on said platen (20) for holding at least one truss member (28) in place with respect to said platen (20) during operation of said press head (8);

frame members (24) are attached to said platen (20) along at least one side thereof to allow connectors (30) to be placed between said upper surface (26) of said platen (20) and said truss members (28) to be used to form a truss, said connectors (30) being pressed into said truss members (28) on operation of said press head (8); and said holding means are mounted on the frame members (24).

17. A press head as claimed in 9, 10 or 12, wherein:

frame members (24) are releasibly attached to the platen (20) along at least one side thereof to allow connectors (30) to be placed between said upper surface (26) of said platen (30) and said truss members (28) to be used to form a truss, said connectors (30) being pressed into said truss members (28) on operation of said press head (28).

18. A press head as claimed 9, 10 or 12, wherein:

the platen (20) and trolley (22) comprise magnetic means for retaining connectors (108) thereon between having the connectors (108) fed to the press head and operation thereof.

19. A press head as claim 9, 10 or 12, wherein:

said platen (20) and trolley (22) comprise magnetic means for retaining connectors (108) thereon between having the connectors (108) fed to the press head and operation thereof; and said magnetic means comprise electromagnets.

* * * * *